(12) United States Patent
Chen et al.

(10) Patent No.: US 10,855,343 B2
(45) Date of Patent: Dec. 1, 2020

(54) METHOD, APPARATUS AND SYSTEM FOR ACQUIRING CODEBOOK BY CHANNEL STATE INFORMATION REPORT TYPE

(71) Applicant: ZTE CORPORATION, Shenzhen (CN)

(72) Inventors: Yijian Chen, Shenzhen (CN); Yu Ngok Li, Shenzhen (CN); Huahua Xiao, Shenzhen (CN); Jianxing Cai, Shenzhen (CN); Zhaohua Lu, Shenzhen (CN); Yong Li, Shenzhen (CN); Yuxin Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/763,284

(22) PCT Filed: Aug. 16, 2016

(86) PCT No.: PCT/CN2016/095548
§ 371 (c)(1),
(2) Date: Mar. 26, 2018

(87) PCT Pub. No.: WO2017/050066
PCT Pub. Date: Mar. 30, 2017

(65) Prior Publication Data
US 2018/0294849 A1 Oct. 11, 2018

(30) Foreign Application Priority Data
Sep. 25, 2015 (CN) .......................... 2015 1 0623580

(51) Int. Cl.
*H04B 7/0417* (2017.01)
*H04B 7/04* (2017.01)
(Continued)

(52) U.S. Cl.
CPC ............. *H04B 7/0417* (2013.01); *H04B 7/04* (2013.01); *H04B 7/0473* (2013.01);
(Continued)

(58) Field of Classification Search
CPC .. H04B 7/0626; H04B 7/0456; H04B 7/0478; H04B 7/0617; H04B 7/0417;
(Continued)

(56) References Cited

U.S. PATENT DOCUMENTS

| 2011/0103493 A1* | 5/2011 | Xia | H04B 7/065 375/259 |
| 2014/0010320 A1* | 1/2014 | Chen | H04W 4/06 375/267 |

(Continued)

FOREIGN PATENT DOCUMENTS

| CN | 102208969 A | 10/2011 |
| CN | 104067675 A | 9/2014 |

*Primary Examiner* — Linda Wong
(74) *Attorney, Agent, or Firm* — George R. McGuire; Bond Schoeneck & King, PLLC

(57) ABSTRACT

Provided are a method, apparatus and system for acquiring a codebook, the method including: generating, by a base station, a codebook corresponding to $N_t$ ports and r layers transmission according to a first preset condition, the codebook being for feeding back a preceding matrix, the first preset condition being a common set condition between the base station and a terminal, $N_t$ being a port number, and r being a transmission layer number; determining, by the base station, a signaling indication method for selecting a codebook subset corresponding to the codebook according to a second preset condition; and acquiring, by the base station, Codebook Subset Selection (CSS) signaling for selecting the codebook subset correspondingly according to the signaling indication method, and notifying the selected codebook subset to a terminal through the CSS signaling.

20 Claims, 8 Drawing Sheets

(51) Int. Cl.
*H04B 7/06* (2006.01)
*H04B 7/0456* (2017.01)

(52) U.S. Cl.
CPC ......... *H04B 7/0639* (2013.01); *H04B 7/0658* (2013.01); *H04B 7/0634* (2013.01)

(58) Field of Classification Search
CPC .. H04B 7/0632; H04B 7/0486; H04B 7/0413; H04B 7/0634; H04B 7/0452; H04B 7/06; H04B 7/0482; H04B 7/0658; H04B 7/0619; H04B 7/0665; H04B 17/336; H04B 17/318; H04B 17/24; H04B 7/061; H04L 5/0048; H04L 5/0023; H04L 5/00; H04L 27/2636; H04L 5/0007; H04L 23/00; H04L 25/03343; H04L 1/0031; H04L 1/06; H04L 2025/03426; H04L 25/0204; H04L 25/0224; H04L 25/03898; H04L 25/03917; H04L 25/03942; H04L 27/20; H04L 1/0606; H04L 1/0618; H04L 1/20; H04L 2025/03808; H04L 27/2601; H04L 5/0005; H04L 5/0028; H04W 72/0413; H04W 88/02; H04W 72/04; H04W 74/002; H04W 16/28; H04W 72/1278; H04W 72/0473; H04W 74/006; H04W 92/18

See application file for complete search history.

(56) References Cited

U.S. PATENT DOCUMENTS

| | | | |
|---|---|---|---|
| 2015/0003553 A1* | 1/2015 | Nammi | H04B 7/0456 375/267 |
| 2015/0372732 A1* | 12/2015 | Kim | H04B 7/04 375/267 |
| 2016/0173176 A1* | 6/2016 | Mizusawa | H04W 16/28 375/267 |
| 2016/0204843 A1* | 7/2016 | Chen | H04W 72/0446 375/267 |
| 2016/0344458 A1* | 11/2016 | Zhao | H04L 25/03898 |
| 2017/0070276 A1* | 3/2017 | Kim | H04W 72/042 |
| 2017/0149549 A1* | 5/2017 | Wang | H04B 7/0456 |
| 2017/0250743 A1* | 8/2017 | Jongren | H04B 7/0617 |
| 2017/0310376 A1* | 10/2017 | Jarmyr | H04B 7/0639 |
| 2018/0198497 A1* | 7/2018 | Wei | H04B 7/0469 |

* cited by examiner

Fig. 1-a i1

|  | 1 | 2 | 3 | 4 | 5 | 6 | 7 | 8 |
|---|---|---|---|---|---|---|---|---|
| 1 | 1 | 3 | 5 | 7 | 9 | 11 | 13 | 15 |
| 2 | 1 | 3 | 5 | 7 | 9 | 11 | 13 | 15 |
| 3 | 1 | 3 | 5 | 7 | 9 | 11 | 13 | 15 |
| 4 | 1 | 3 | 5 | 7 | 9 | 11 | 13 | 15 |
| 5 | 2 | 4 | 6 | 8 | 10 | 12 | 14 | 16 |
| 6 | 2 | 4 | 6 | 8 | 10 | 12 | 14 | 16 |
| 7 | 2 | 4 | 6 | 8 | 10 | 12 | 14 | 16 |
| 8 | 2 | 4 | 6 | 8 | 10 | 12 | 14 | 16 | i2

Fig. 1-b i1

|  | 1 | 2 | 3 | 4 | 5 | 6 | 7 | 8 |
|---|---|---|---|---|---|---|---|---|
| 1 | 1 | 1 | 2 | 2 | 9 | 10 | 17 | 18 |
| 2 | 1 | 1 | 2 | 2 | 10 | 9 | 18 | 17 |
| 3 | 3 | 3 | 4 | 4 | 11 | 12 | 19 | 20 |
| 4 | 3 | 3 | 4 | 4 | 12 | 11 | 20 | 19 |
| 5 | 5 | 5 | 6 | 6 | 13 | 14 | 21 | 22 |
| 6 | 5 | 5 | 6 | 6 | 14 | 13 | 22 | 21 |
| 7 | 7 | 7 | 8 | 8 | 15 | 16 | 23 | 24 |
| 8 | 7 | 7 | 8 | 8 | 16 | 16 | 24 | 23 | i2

METHOD, APPARATUS AND SYSTEM FOR ACQUIRING CODEBOOK BY CHANNEL STATE INFORMATION REPORT TYPE

CROSS-REFERENCE TO RELATED APPLICATION

This application is the 371 application of PCT Application No. PCT/CN2016/095548, filed Aug. 16, 2016, which is based upon and claims priority to Chinese Patent Application No. 201510623580.4, filed Sep. 25, 2015, the entire contents of which are incorporated herein by reference.

TECHNICAL FIELD

The embodiments of the present disclosure relate to, but are not limited to the field of communications, and in particular, to a method, apparatus, and system for acquiring a codebook.

BACKGROUND

With the development of multi-input multi-output (Multi-input Multi-output, referred to as MIMO) technologies, the number of antennas supported by a transmitting end is increasing, resulting in an increasingly larger dimension of a channel matrix and increasingly larger dimension needing for channel information feedback. In case of keeping the quantization accuracy similar to that of a smaller number of antennas, the feedback overhead will be increased exponentially; in addition, too many codewords will cause the problem of significant increasing in terminal complexity. One solution is to use the correlation characteristics of a channel between a terminal and a base station to preconfigure a codebook with a high quantization efficiency that matches with the channel. There may be only a few codewords in the codebook, but due to the close match with the channel, the code book has very high quantization efficiency. However, there is no good solution for the codebook configuration problem at current.

In the related art, bitmap mapping needs to be performed on the codewords in the codebook. Each codeword corresponds to one bit, and a status bit of the bit indicates whether the codeword is selected. Because each codeword corresponds to one bit, signaling overhead will be enormous if the codebook is large.

No effective solution has been proposed yet for the problem in the related art that the signaling overhead will be increased if the codebook is large because each codeword corresponds to one bit.

This section provides background information related to the present disclosure which is not necessarily prior art.

SUMMARY

The embodiments of the present disclosure provides a method, apparatus, and system for acquiring a codebook, so as to at least solve the problem in the related art that the signaling overhead will be increased if the codebook is large because each codeword corresponds to one bit.

The following is a summary of the topics described herein. The summary is not intended to limit the protection scope of the claims.

According to an aspect of the embodiments of the present disclosure, there is provided a method for acquiring a codebook, including:

generating, by a base station, a codebook corresponding to $N_t$ ports and r layers transmission according to a first preset condition, the codebook being for feeding back a precoding matrix, the first preset condition being a common set condition between the base station and a terminal, determining, by the base station, a signaling indication method for selecting a codebook subset of the codebook according to a second preset condition; acquiring, by the base station, CSS signaling for selecting a codebook subset correspondingly according to the signaling indication method, and notifying the selected codebook subset to the terminal through the CSS signaling.

According to an aspect of the embodiments of the present disclosure, there is provided another method for acquiring a codebook, including:

generating, by a terminal, a codebook corresponding to $N_t$ ports and r layers transmission according to a first preset condition, the codebook being for feeding back a precoding matrix, the first preset condition being a common set condition between a base station and the terminal; determining, by the terminal, a signaling indication method for selecting a codebook subset of the codebook according to a fourth preset condition; receiving, by the terminal, signaling for selecting a codebook subset; and determining, by the terminal, the codebook subset according to the signaling indication method and the signaling for selecting a codebook subset.

According to an aspect of the embodiments of the present disclosure, there is provided another method for acquiring a codebook, including: generating, by a base station, a main codebook corresponding to $N_t$ ports and r layers transmission according to a first preset condition, the codebook being for feeding back a precoding matrix, the first preset condition being a common set condition between the base station and a terminal;

generating, by the base station, a codeword set corresponding to the codebook according to a sixth preset condition and the main codebook; and configuring, by the base station, the codebook according to a notification, the notification including at least one of the followings: selection information of the codeword set, and selection information of codewords in the codeword set.

According to another aspect of the embodiments of the present disclosure, there is provided an apparatus for acquiring a codebook, including:

a codebook generation module configured to generate a codebook corresponding to Nt ports and r layers transmission according to a first preset condition, the codebook being for feeding back a precoding matrix, the first preset condition being a common set condition between a base station and a terminal;

a method determination module configured to determine a signaling indication method for selecting a codebook subset of the codebook according to a second preset condition; and a notification module configured to acquire CSS signaling for selecting a codebook subset correspondingly according to the signaling indication method, and notify the selected codebook subset to the terminal through the CSS signaling.

According to another aspect of the embodiments of the present disclosure, there is provided another apparatus for acquiring a codebook, including:

a codebook generation module configured to generate a codebook corresponding to $N_t$ ports and r layers transmission according to a first preset condition, the codebook being for feeding back a precoding matrix, the first preset condition being a common set condition between a base station and a terminal;

a determination module configured to determine a signaling indication method for selecting a codebook subset of the codebook according to a fourth preset condition;

a signaling receiving module configured to receive signaling for selecting a codebook subset; and a codebook subset determination module configured to determine the codebook subset according to the signaling indication method and the signaling for selecting a codebook subset.

According to another aspect of the embodiments of the present disclosure, there is provided another apparatus for acquiring a codebook, including:

a codebook generation module configured to generate a main codebook corresponding to Nt ports and fed back by a precoding matrix transmitted in a layer r by the base station according to a first preset condition, the first preset condition being a common set condition between a base station and a terminal;

a codeword set generation module configured to generate a codeword set corresponding to the codebook according to a sixth preset condition and the main codebook by the base station; and a configuration module configured to configure the codebook according to a notification, the notification including at least one of the followings: selection information of the codeword set, and, selection information of codewords in the codeword set.

According to another aspect of the embodiments of the present disclosure, there is provided a system for acquiring a codebook, including: a base station and a terminal, the base station and the terminal being in communication connection, wherein the base station is one apparatus for acquiring a codebook or another apparatus for acquiring a codebook mentioned above; and the terminal is another apparatus for acquiring a codebook mentioned above.

According to the embodiments of the present disclosure, the base station is adopted to generate the codebook corresponding to Nt ports and r layer transmission according to the first preset condition, the codebook being for feeding back a precoding matrix, the first preset condition being a common set condition between the base station and the terminal; the base station determines the signaling indication method for selecting a codebook subset of the codebook according to the second preset condition; and the base station obtains the CSS signaling for selecting a codebook subset correspondingly according to the signaling indication method, and notifies the selected codebook subset to the terminal through the CSS signaling, thus solving the problem that the signaling overhead will be increased if the codebook is large because each codeword corresponds to one bit, so as to achieve the effect of decreasing the signaling overhead.

Other aspects will become apparent upon reading and understanding the drawings and detailed description.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings illustrated here serve to provide a further understanding of the present disclosure and constitute a part of the application, and the illustrative embodiments of the present disclosure and together with the description thereof serve to explain the present disclosure, and do not constitute inappropriate definition to the present disclosure. In the drawings:

FIG. 1-*a* is a schematic diagram of one function mapping in the method for acquiring a codebook according to the embodiment of the present disclosure;

FIG. 1-*b* is a schematic diagram of another function mapping in the method for acquiring a codebook according to the embodiment of the present disclosure;

FIG. 1-*c* is a schematic diagram of another function mapping in the method for acquiring a codebook according to the embodiment of the present disclosure;

FIG. 1-*d* is a schematic diagram of another function mapping in the method for acquiring a codebook according to the embodiment of the present disclosure;

DETAILED DESCRIPTION

The present disclosure will be explained in detail with reference to the accompanying drawings and embodiments hereinafter. It should be noted that, in case of no conflict, the embodiments in the present application and the features in the embodiments may be combined with each other.

It should be noted that the terms "first", "second" and the like in the description and claims of the present disclosure as well as the above drawings are used to distinguish similar objects, and are not necessarily adapted to describe a specific sequence or a chronological order.

First Embodiment

Figure 1:
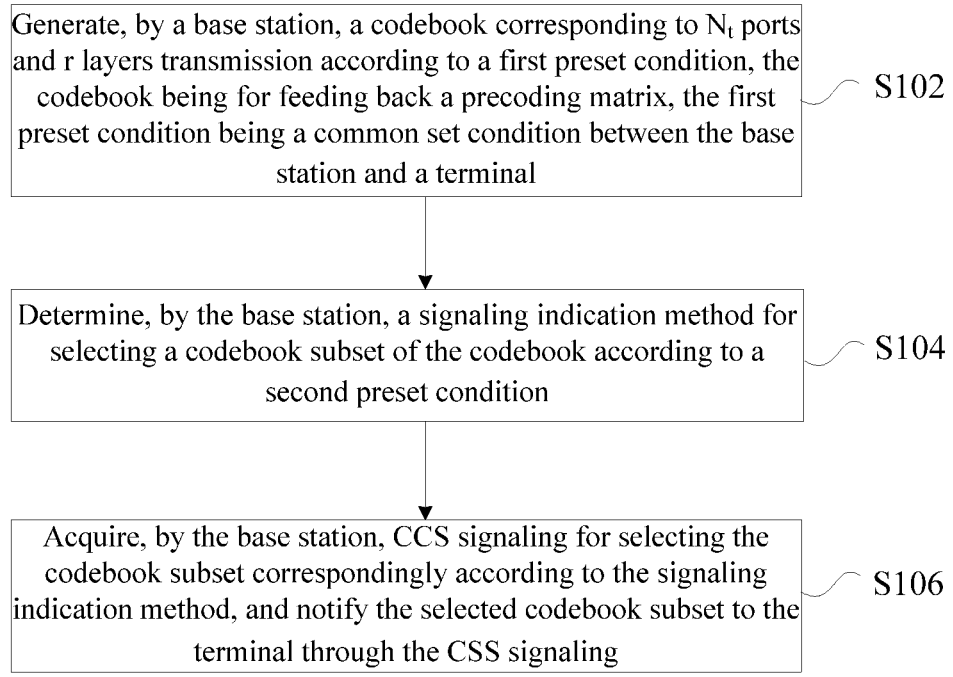
FIG. 1 is a flow chart of a method for acquiring a codebook according to an embodiment of the present disclosure.

In this embodiment, a method for acquiring a codebook is provided. FIG. 1 is a flow chart of a method for acquiring a codebook according to the embodiment of the present disclosure. As shown in FIG. 1, at a base station side, the flow chart includes the following steps.

In step S102, a base station generates a codebook corresponding to $N_t$ ports and r layers transmission according to a first preset condition, the codebook being for feeding back a precoding matrix, the first preset condition being a common set condition between the base station and a terminal.

In step S104, the base station determines a signaling indication method for selecting a codebook subset of the codebook according to a second preset condition.

In step S106, the base station acquires Codebook Subset Selection (CSS) signaling for selecting the codebook subset correspondingly according to the signaling indication method, and notifying the selected codebook subset to the terminal through the CSS signaling.

To be specific, with reference to step S102 to step S106, at the base station side, the base station generates the codebook corresponding to the Nt ports and r layers transmission at the base station side firstly, the codebook being for feeding back the precoding matrix; secondly, the base station determines the signaling indication method for selecting a codebook subset of the codebook according to the second preset condition; and finally, the base station obtains the CSS signaling for selecting a codebook subset correspondingly according to the signaling indication method, and notifies the selected codebook subset to the terminal through the CSS signaling. The codebook generation manner of the base station is the same as the codebook generation manner of the terminal.

Through the above steps, the base station is adapted to generate the codebook corresponding to the Nt ports and r layers transmission, the codebook being for feeding back the precoding matrix according to the first preset condition, the first preset condition being the common set condition between the base station and the terminal; the base station determines the signaling indication method for selecting a codebook subset of the codebook according to the second preset condition; and the base station obtains the CSS signaling for selecting a codebook subset correspondingly according to the signaling indication method, and notifies the selected codebook subset to the terminal through the CSS signaling, thus solving the problem that the signaling overhead will be increased if the codebook is large because each codeword corresponds to one bit, so as to achieve the effect of decreasing the signaling overhead.

Optionally, the first preset condition at least includes one of the followings: agreeing with the terminal to save the same codebook or generating the same codebook according to the same manner.

Optionally, the codebook includes at least one of the followings: $C_b(r)$ containing $M_r$ precoding codewords, wherein r is an integer greater than or equal to 1; a first main codebook $C_{b1}(r)$ containing $M_{r1}$ precoding codewords, and a second main codebook $C_{b2}(r)$ containing $M_{r2}$ precoding codewords.

The method for acquiring a codebook provided by the embodiment of the present application herein includes at least two codebook generation manners: a first manner is that the base station and the terminal keep a fixed codebook together; and a second manner is that the base station and the terminal generate a codebook according to the same manner.

Moreover, in the method for acquiring a codebook provided by the embodiment of the present application, the codebook generated at the base station side includes the two main codebooks above, i.e., the $C_b(r)$ containing $M_r$ precoding codewords, wherein r is an integer greater than or equal to 1; the first main codebook $C_{b1}(r)$ containing $M_{r1}$ precoding codewords, and the second main codebook $C_{b2}(r)$ containing $M_{r2}$ precoding codewords.

To be specific, the step of generating a codebook at the base station side is as follows.

(I) The generation process of the main codebook $C_b(r)$ is as follows.

In a first manner, the base station and the terminal keep a fixed codebook together.

For example, for a 4Tx codebook (a single PMI codebook) defined in Release 8 of LTE, a total layer number v takes values of 1, 2, 3, 4, and all the main codebooks have one index only.

Table 1 is the 4Tx codebook (single PMI codebook) defined in Release 8 of LTE.

TABLE 1

| Codebook index | $u_n$ | \multicolumn{4}{c}{Total layer number v} | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |

TABLE 1-continued

| Codebook index | $u_n$ | Total layer number $\upsilon$ | | | |
|---|---|---|---|---|---|
| | | 1 | 2 | 3 | 4 |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

For another example, for a 8Tx codebook (double PMI codebook) defined in Release 10 of LTE, as shown in Table 2, the situation that layer $\upsilon=1$ is only listed here for illustration; the main codebook has two indexes: the following variables (scalar/vector) are defined: $\phi_n = e^{j\pi n/2}$, $v_m = [1\ e^{j2\pi m/32}\ e^{j4\pi m/32}\ e^{j6\pi m/32}]^T$. A Rank1 codeword, a model and a codebook of the Rank1 codeword are defined on the basis of the above-mentioned variables:

$$W_{m,n}^{(1)} = \frac{1}{\sqrt{8}}\begin{bmatrix} v_m \\ \varphi_n v_m \end{bmatrix}.$$

In a first circumstance, the base station and the terminal generate a main codebook $C_b(r)$ of layer 1 on the basis of a model and configuration parameters, wherein the model is as follows:

$$W_{mv,mh,n}^{(1)} = \begin{bmatrix} v_{mv} \otimes v_{mh} \\ \phi_n v_{mv} \otimes v_{mh} \end{bmatrix}.$$

One situation is that each codeword corresponds to three PMIs i1, i2 and i3; and constructing a codebook by the configuration parameters may include:

TABLE 2

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ |

Actually, it may be also expanded to the situation that the codeword saved in one codebook is corresponding to more than two codebooks. For instance, three indexes i1, i2 and i3 are respectively defined, a codeword W is associated with the above three indexes, which may be represented in a multi-table form or a function form; this is because that when more dimensions are considered, each dimension feeds back a precoding matrix indicator (Precoding Matrix Indicator, PMI), which increases the number of the PMI; for example, i1 represents long-term wide band channel information of the horizontal and vertical dimensions, i2 represents short-term sub-band channel information of the horizontal dimension, and i3 represents short-term sub-band channel information of the vertical dimension.

For another example, four indexes i1, i2, i3 and i4 are defined, and a codeword W is generated by a model, and the finally generated codeword W is associated with the above four indexes, which may be represented in a multi-table form or a function form; this is because that when more dimensions are considered, each dimension respectively feeds back a PMI, which increases the number of the PMIs; for example, i1 represents the long-term wide band channel information of the horizontal dimension, i2 represents the long-term wide band channel information of the vertical dimension, i3 represents the short-term sub-band channel information of the horizontal dimension, and i4 represents the short-term sub-band channel information of the vertical dimension.

In the second manner, the base station and the terminal generate a codebook according to the same manner.

configuring value ranges of i1, i2 and i3, for instance, 0 to 15, 0 to 8, and 0 to 31, or the like;

configuring a functional relationship between $W_{mv,mh,n}^{(1)}$ and i1, i2 and i3; in the case that the values of i1, i2 and i3 are determined, configuring the functional relationship is really equivalent to configuring one codebook, and i1*i2*i3 codewords may be determined;

for example, configuring mv as a function of at least one of i1, i2 and i3;

mv=$f_1$(i1,i2,i3), mv=$f_2$(i1,i2), mv=$f_3$(i2,i3);

for example, configuring mh as a function of at least one of i1, i2 and i3;

mh=$f_4$(i1,i2,i3), mv=$f_5$(i1,i2), mv=$f_6$(i2,i3);

configuring n as a function of i3, n=$f_7$(i3).

Optionally, the functional relationship here may be a linear functional relationship, for instance: a×i1+b×i2+i3, a×b×i1+b×i2+i3, a×b×i1+b×i2, a×i1+i2.

When configuring a function, it is necessary to configure a function expression and multiple parameters in the function such as the values of a, b and c.

In other situations, the codebook may correspond to one PMI, two PMIs, and four PMIs, and the codebook generation manners are configured similarly: agreeing a generation model in advance, and configuring a functional relationship between the codeword index and the codeword generation parameter.

One manner is that the base station configures some parameters to construct the codebook, and finally determines a functional relationship between indexes and the codewords, for instance:

defining a codeword generation method:

$$W = \begin{bmatrix} X_1 \otimes X_2 & O \\ O & X_1 \otimes X_2 \end{bmatrix} W_2,$$

wherein, X1 and X2 are a matrix constituted by a DFT vector, and W2 is a matrix of r rows; N1 and N2 are dimensions of the DFT vector in X1 and X2 respectively, $O_{d1}$ and $O_{d2}$ are density control parameters of the DFT vector of X1 and X2, and moreover, a spacing control parameter of the DFT vector may also be introduced; and the codebook may be constructed on the basis of the configuration of these parameters.

In a second circumstance, the base station and the terminal generate a main codebook $C_b(r)$ with two layers on the basis of a model and configuration parameters, wherein the model is as follows:

$$W^{(2)}_{mv,mh,n} = \begin{bmatrix} v_{mv} \otimes v_{mh} & v_{mv} \otimes v_{mh} \\ \phi_n v_{mv} \otimes v_{mh} & -\phi_n v_{mv} \otimes v_{mh} \end{bmatrix}.$$

One situation is that each codeword corresponds to four PMIs i1, i2, i3 and i4; and constructing a codebook by the configuration parameters may include:

configuring the value ranges of i1, i2, i3 and i4, for instance, 0 to 15, 0 to 8, 0 to 31, 0 to 63, or the like;

configuring a functional relationship between $W^{(1)}_{mv,mh,n}$ and i1, i2, i3 and i4; in the case that the values of i1, i2, i3 and i4 are determined, configuring the functional relationship is really equivalent to configuring one codebook, and i1*i2*i3*i4 codewords may be determined;

for example, configuring my as a function of at least one of i1, i2, i3 and i4;

mv=$f_1$(i1,i2,i3,i4), mv=$f_2$ (i1,i2), mv=$f_3$(i3,i4);

for example, configuring mh as a function of at least one of i1, i2 and i3;

mh=$f_5$(i1,i2,i3,i4), mh=$f_6$(i1,i2), mh=$f_7$(i3,i4);

configuring n as a function of i3, n=$f_7$(i3).

In an embodiment, the functional relationship here may be a linear functional relationship, for instance: a×c×i1+b× d×i2+c×i3+d×i4, a×i1+b×i2+i3, a×i1+b×i2+i3 a×b×i1+b× i2+i3, a×b×i1+b×i2, a×i1+i2. When configuring a function, it is necessary to configure a function expression and multiple parameters in the function such as the values of a, b and c.

Moreover, the base station and the terminal may also agree a more complicated model and configuration parameters to generate a main codebook $C_b(r)$ with two layers, wherein the model is as follows:

$$W^{(2)}_{mv,mh,mv',mh',n} = \begin{bmatrix} v_{mv} \otimes v_{mh} & v_{mv'} \otimes v_{mh'} \\ \phi_n v_{mv} \otimes v_{mh} & -\phi_n v_{mv'} \otimes v_{mh'} \end{bmatrix}$$

$$W^{(1)}_{mv,mh,mv',mh',n} = \begin{bmatrix} v_{mv} & \otimes v_{mh} \\ \phi_n v_{mv'} & \otimes v_{mh'} \end{bmatrix}.$$

If there is a more complicated relationship between the codebook construction parameters and the codeword indexes, the codebook generation method is similar to that in the foregoing embodiments.

(II) The generation process of the first main codebook $C_{b1}(r)$ and the second main codebook $C_{b2}(r)$ is as follows.

Similar to the above-mentioned process, one codebook may be divided into two codebooks for generating, saving and configuring respectively.

For instance, each codebook W of the codebook Cb(r) may be written into a form that W=W1*W2, wherein an expression of W1 is as follows:

$$W1 = \begin{bmatrix} X_H^k \otimes X_V^l & 0 \\ 0 & X_H^{k'} \otimes X_V^{l'} \end{bmatrix};$$

$$W_2 \in C_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\} Y \in \{e_1^\%, e_2^\%, \ldots, e_M^\%\}$$

$$W_2 \in C_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\},$$

$$(Y_1, Y_2) \in \{(e_i^\%, e_i^\%), (e_i^\%, e_{i+1}^\%), (e_i^\%, e_{i+2}^\%), (e_i^\%, e_{i+3}^\%)\}$$

$e_n\%$ is a row selection vector, wherein only the $n^{th}$ element is 1, and the others are 0; then, the expressions of some foregoing codeword are as follows:

$$W^{(1)}_{mv,mh,n} = \begin{bmatrix} v_{mv} & \otimes v_{mh} \\ \phi_n v_{mv} & \otimes v_{mh} \end{bmatrix} W^{(2)}_{mv,mh,n} = \begin{bmatrix} v_{mv} \otimes v_{mh} & v_{mv} \otimes v_{mh} \\ \phi_n v_{mv} \otimes v_{mh} & -\phi_n v_{mv} \otimes v_{mh} \end{bmatrix},$$

then the codebooks of W1 and the codebooks of W2 may be respectively saved, and the codebooks in W1 and the codebooks in W2 are utilized through one function to construct W;

W1 and W2 respectively correspond to the codebooks Cb1(r) and Cb2(r), and the methods for saving, configuring and generating each codebook are similar to the foregoing methods for saving, configuring and generating the Cb(r).

In the embodiment of the present disclosure, the second preset condition includes at least one of the followings:

the codeword number contained in the Cb(r), a functional relationship parameter between the codeword and PMI(s), a codebook generation parameter, a feedback mode configuration using the codebook, a port number Nt, a layer number r, a size of a configuration codebook to be configured currently, a channel state information report type (CSI Report Type) configuration using the codebook, a feedback class (Class) A or B, and a codeword generation model.

Optionally, in the case that the codebook is the Cb(r) containing Mr precoding codewords, the determining, by the base station, the signaling indication method for selecting the codebook subset of the codebook according to the second preset condition includes the following manners:

first manner: determining a relationship between CSS signaling bits and $C_b(r)$ codewords, or, determining a relationship between the CSS signaling bits and at least one index of the $C_b(r)$ codebook; wherein, at least one of the codeword index is included in the $C_b(r)$ codebook;

to be specific, the process of determining the relationship between the CSS signaling bit and the $C_b(r)$ codeword is as follows:

since the large codebook has a large number of codewords, for example, more than 1000 codewords, a small codebook is used as an example to illustrate: there are two kinds of mappings between the CSS signaling bits and the $C_b(r)$ codewords; this relationship may be expressed in a simpler way by means of function, which may be specifically described in the forms of FIG. 1-a and FIG. 1-b; the two mapping methods are different. The same signaling bits correspond to different multiple codeword sets; and different mapping manners may be used for different situations:

for instance:

different mapping methods may be used in different terminals, and this flexibility may be achieved by notifying the mapping manners by using high-layer signaling with respect to individual UE in an explicit way;

different mapping methods may be used for different feedback modes (Mode);

for example, it is agreed that a mapping manner 1 is used in a feedback mode 1-1 of a physical uplink control channel defined in an LTE protocol, and a mapping mode 2 is used in a feedback mode 2-1 of the physical uplink control channel; for another example, it is agreed that the mapping mode 1 is used in a feedback mode 1-2 of a physical uplink shared channel and the mapping mode 2 is used in a feedback mode 3-1 of the physical uplink shared channel; in this case, the base station and the terminal determine the mapping manner according to the current corresponding feedback mode;

different mapping methods may be used for different feedback classes (Class). For example, the mapping manner 1 may be used for a feedback class A, and the mapping manner 2 may be used for a feedback class B;

different mapping methods may be used for different layer numbers r (layer r); for example, the mapping manner 1 may be used when r=1, and the mapping manner 2 may be used when r=2;

different mapping methods may be used for different codeword models; for example, the mapping manner 1 may be used for a codeword model 1, and the mapping manner 2 may be used for a codeword model 2; as shown in FIG. 1-c, a shadow color part corresponds to the codeword model 1, while a white part corresponds to the codeword model 2;

different mapping manners may be used for the functional relationships between different PMI indexes and the codeword W when a total codebook is generated; for example, the above-mentioned expressions of the functional relationships between my and mh and the indexes i1, i2, i3, and i4 are different, and the mapping relationships may be different, which may be determined based on the number of parameters contained in the expressions and the values of the codebook constructing parameters a, b, c, d, or the like;

different mapping manners may be used if the configuration parameters when generating different total codebooks, such as the configurations of N1 and N2 mentioned above, the configurations of the density control parameters of the DFT vector, and the spacing control parameter of the DFT vector are different;

and/or, second manner: determining a bit length of the CSS signaling;

to be specific, the process of determining the bit length of the CSS signaling and the corresponding codeword number is as follows:

for instance: there are two lengths of the CSS signaling bit, and two codeword set numbers corresponding to each bit, which are as shown in Table 3 below;

TABLE 3

| Q bit | 2Q bit |
|---|---|
| 1 bit corresponds to 2P codewords | 1 bit corresponds to P codewords | different lengths of the CSS signaling bit and codeword set numbers corresponding to each bit may be used for different terminals, and this flexibility can be achieved by notifying the mapping manners with respect to each UE by high-layer signaling in an explicit way;

different lengths of the CSS signaling bit and codeword set numbers corresponding to each bit may be used for different feedback modes (Mode); for example, it is agreed that Q bits, each of which corresponding to 2P codewords, are used in a feedback mode 1-1 of the physical uplink control channel defined in the LTE protocol, and 2Q bits, each of which corresponding to P codewords, are used in a feedback mode 2-1 of the physical uplink control channel; for another example, it is agreed that Q bits with each bit corresponding to 2P codewords are used in a feedback mode 1-2 of the physical uplink control channel defined, and 2Q bits with each bit corresponding to P codewords are used in a feedback mode 3-1 of the physical uplink control channel; in this case, the base station and the terminal determine the length of the CSS signaling bit and the codeword set number corresponding to each bit, according to the current corresponding feedback mode;

different lengths of CSS signaling bit and codeword set numbers corresponding to each bit may be used for different feedback classes (Class); for example, it is agreed that Q bits with each bit corresponding to 2P codewords may be used in a feedback class A, and 2Q bits with each bit corresponding to P codewords may be used in a feedback class B;

different lengths of CSS signaling bit and codeword set numbers corresponding to each bit may be used for different layer numbers r (layer r); for example, Q bits with each bit corresponding to 2P codewords may be used when r=1, and 2Q bits with each bit corresponding to P codewords may be used when r=2;

other situations are as follows: there are four lengths of the CSS signaling bit, and four codeword set numbers corresponding to each bit, which are as shown in Table 4 below;

TABLE 4

| Q bit | 2Q bit | 4Q bit | 8Q bit |
|---|---|---|---|
| 1 bit corresponds to 8P codewords | 1 bit corresponds to 4P codewords | 1 bit corresponds to 2P codewords | 1 bit corresponds to P codewords | also similarly, the length of the CSS signaling bit and the codeword set number corresponding to each bit may be determined according to the above conditions;

different lengths of the CSS signaling bit and codeword set number corresponding to each bit may be used for different codeword models; for example, Q bits with each bit corresponding to 2P codewords may be used for the codeword model 1 and 2Q bits with each bit corresponding to P codewords may be used for the codeword model 2; as shown in FIG. 1-d, a shadow part corresponds to the codeword model 1, while a white part corresponds to the codeword model 2;

and/or, third manner: determining the total codeword number indicated by the CSS signaling.

To be specific, the process of determining the total codeword number indicated by the CSS signaling is as follows. The total codeword number indicated by the CSS signaling may be determined according to the following manners:

the total codeword number indicated by the CSS signaling may be determined according to the configuration signaling of the signaling indication method for selecting a codebook subset, wherein the signaling is the maximum codeword number parameter of a to-be-constructed sub-codebook configured by the base station, and the parameter may be configured with respect to different feedback modes, different Report Types, layer numbers and feedback classes (Class);

the codeword number of different sub-codebooks to be constructed may be determined according to different feedback classes (Class), for example, the maximum codeword number for a Class A is 256, and the maximum codeword number for a Class B is 64;

the codeword number of different sub-codebooks to be constructed may be determined according to different layers, for example, the codeword number for a layer 1 is 256, and the codeword number for a layer 2 is 64;

the codeword number of different sub-codebooks to be constructed may be determined according to different feedback modes, for example, the codeword number for a PUSCH Mode 3-1 is 256, and the codeword number for a PUSCH 3-2 is 64;

the codeword number of different sub-codebooks to be constructed may be determined according to Report Type, for example, the codeword number for one type is 4, and the codeword number for another Type is 16; and the codeword number is related to the bearing capacity of the Type and an error rate requirement; and the codeword number of different sub-codebooks to be constructed may be determined according to the port number $N_t$, for example, the codeword number of the sub-codebook to be constructed is 64 when $N_t$ is 16, and the codeword number of the sub-codebook to be constructed is 16 when $N_t$ is 8.

Optionally, in the case that the codebook is the first main codebook Cb1($r$) and the second main codebook Cb2($r$), the determining, by the base station, the signaling indication method for selecting the codebook subset of the codebook according to the second preset condition includes the following manners:

first manner: determining a relationship between the CSS signaling bit and the $C_{b1}(r)$ and/or $C_{b2}(r)$ codeword; or, determining a relationship between the CSS signaling bit and the codeword index of the $C_{b1}(r)$ and/or $C_{b2}(r)$ codebook; wherein, the $C_{b1}(r)$ codebook has at least one codeword, and the $C_{b2}(r)$ codebook has at least one codeword index;

similar to the method mentioned in 2A above, the only difference is that one codebook is divided into two codebooks, and the codebook configuration methods are essentially the same.

To be specific, the process of determining the relationship between the CSS signaling bit and the $C_{b1}(r)$ and/or $C_{b2}(r)$ codeword is as follows:

in a first circumstance, the process of determining the relationship between the CSS signaling bit and the $C_{b1}(r)$ codeword is as follows;

different mapping methods may be used for different terminals, this flexibility can be achieved by notifying the mapping manners with respect to each UE by high-layer signaling in an explicit way;

different mapping methods may be used for different feedback modes (Mode); for example, it is agreed that a mapping manner 1 is used for a feedback mode 1-1 of a physical uplink control channel defined in an LTE protocol, and a mapping mode 2 is used for a feedback mode 2-1 of the physical uplink control channel; for another example, it is agreed that the mapping mode 1 is used for a feedback mode 1-2 of a physical uplink shared channel and the mapping mode 2 is used for a feedback mode 3-1 of the physical uplink shared channel; in this case, the base station and the terminal determine the mapping manner according to the current corresponding feedback mode;

different mapping methods may be used for different feedback classes (Class); for example, the mapping manner 1 may be used for a feedback class A, and the mapping manner 2 may be used for a feedback class B;

different mapping methods may be used for different layer numbers r (layer r); for example, the mapping manner 1 may be used when r=1, and the mapping manner 2 may be used when r=2;

different mapping methods may be used for different codeword models; for example, the mapping manner 1 may be used for a codeword model 1, and the mapping manner 2 may be used for a codeword model 2;

different mapping manners may be used for the functional relationships between different PMI indexes and the codeword W generated by a total codebook; for example, the above-mentioned expressions of the functional relationships between my and mh and the indexes i1, i2, i3, and i4 are different, and the mapping relationships may be different, which may be determined based on the number of parameters contained in the expressions and the values of the codebook constructing parameters a, b, c, d, or the like;

different mapping manners may be used if the configuration parameters for generating different total codebooks, such as the configurations of N1 and N2 mentioned above, the configurations of the density control parameters of the DFT vector, and the spacing control parameter of the DFT vector are different;

in a second circumstance, the process of determining the relationship between the CSS signaling bit and the $C_{b2}(r)$ codeword is as follows;

different mapping methods may be used for different terminals, this flexibility can be achieved by notifying mapping manners with respect to each UE by high-layer signaling in an explicit way;

different mapping methods may be used for different feedback modes (Mode); for example, it is agreed that a mapping manner 1 is used for a feedback mode 1-1 of a physical uplink control channel defined in an LTE protocol, and a mapping mode 2 is used for a feedback mode 2-1 of the physical uplink control channel; for another example, it is agreed that the mapping mode 1 is used for a feedback mode 1-2 of a physical uplink shared channel and the mapping mode 2 is used for a feedback mode 3-1 of the physical uplink shared channel; in this case, the base station and the terminal determine the mapping manner according to the current corresponding feedback mode;

different mapping methods may be used for different feedback classes (Class); for example, the mapping manner 1 may be used for a feedback class A, and the mapping manner 2 may be used for a feedback class B;

different mapping methods may be used for different layer numbers r (layer r); for example, the mapping manner 1 may be used when r=1, and the mapping manner 2 may be used when r=2;

different mapping methods may be used for different codeword models; for example, the mapping manner 1 may be used for a codeword model 1, and the mapping manner 2 may be used for a codeword model 2;

different mapping manners may be used for the functional relationships between different PMI indexes and the codeword W generated by a total codebook; for example, the above-mentioned expressions of the functional relationships between my and mh and the indexes i1, i2, i3, and i4 are different, and the mapping relationships may be different, which may be determined based on the number of parameters contained in the expressions and the values of the codebook constructing parameters a, b, c, d, or the like;

and/or, second manner: determining the length of the CSS signaling bit;

to be specific, the process of determining the length of the CSS signaling bit and the codeword number corresponding to each bit is as follows:

different lengths of the CSS signaling bit and codeword set numbers corresponding to each bit may be used for different terminals, and this flexibility can be achieved by notifying mapping manners with respect to each UE by high-layer signaling in an explicit way;

different lengths of the CSS signaling bit and codeword set numbers corresponding to each bit may be used for different feedback modes (Mode); for example, it is agreed that Q bits with each bit corresponding to 2P codewords are used for a feedback mode 1-1 of the physical uplink control channel defined in the LTE protocol, and 2Q bits with each bit corresponding to P codewords are used for a feedback mode 2-1 of the physical uplink control channel; for another example, it is agreed that Q bits with each bit corresponding to 2P codewords are used for a feedback mode 1-2 of the physical uplink control channel defined, and 2Q bits with each bit corresponding to P codewords are used for a feedback mode 3-1 of the physical uplink control channel; in this case, the base station and the terminal determine the length of the CSS signaling bit according to the current corresponding feedback mode, and the codeword set number corresponding to each bit;

different lengths of CSS signaling bit and codeword set numbers corresponding to each bit may be used for different feedback classes (Class); for example, it is agreed that Q bits with each bit corresponding to 2P codewords may be used for a feedback class A, and 2Q bits with each bit corresponding to P codewords may be used for a feedback class B;

different lengths of CSS signaling bit and codeword set numbers corresponding to each bit may be used for different layer numbers r (layer r); for example, Q bits with each bit corresponding to 2P codewords may be used when r=1, and 2Q bits with each bit corresponding to P codewords can be used when r=2;

and/or, third manner: determining the total codeword number indicated by the CSS signaling;

to be specific, the process of determining the total codeword number indicated by the CSS signaling is as follows:

the total codeword number indicated by the CSS signaling may be determined according to the following manners:

the total codeword number indicated by the CSS signaling may be determined according to the configuration signaling of the signaling indication method for selecting a codebook subset, wherein the signaling is the maximum codeword number parameter of a sub-codebook to be constructed, configured by the base station, and the parameter may be configured with respect to different feedback modes, different Report Types, layer numbers and feedback classes (Class);

the codeword number of different sub-codebooks to be constructed may be determined according to different feedback classes (Class), for example, the maximum codeword number for Class A is 256, and the maximum codeword number for Class B is 64;

the codeword number of different sub-codebooks to be constructed may be determined according to different layers, for example, the codeword number for a layer 1 is 256, and the codeword number for a layer 2 is 64;

the codeword number of different sub-codebooks to be constructed may be determined according to different feedback modes, for example, the codeword number for a PUSCH Mode 3-1 is 256, and the codeword number for a PUSCH 3-2 is 64;

the codeword number of different sub-codebooks to be constructed may be determined according to Report Types, for example, the codeword number for one type is 4, and the codeword number for another Type is 16; and the codeword number is related to the bearing capacity of the Type and an error rate requirement; and the codeword number of different sub-codebooks to be constructed may be determined according to the port number $N_t$, for example, the codeword number of the sub-codebook to be constructed is 64 when $N_t$ is 16, and the codeword number of the sub-codebook to be constructed is 16 when $N_t$ is 8;

and/or, four manner: determining that the codebook corresponding to a codebook subset selecting indication is the $C_{b1}(r)$ and/or the $C_{b1}(r)$.

Optionally, the second preset condition includes at least one of the followings: the codeword number contained in the $C_b(r)$, a functional relationship parameter between the codeword and PMI(s), a codebook generation parameter, a feedback mode configuration using the codebook, a port number $N_t$, a layer number r, the size of a configuration codebook to be configured currently, a channel state information report type (CSI Report Type) configuration using the codebook, a feedback class (Class) A or B, and a codeword generation model, wherein the feedback mode includes: at least one of a PUCCH feedback mode and a PUSCH feedback mode.

Optionally, the method for acquiring a codebook provided by the embodiment of the present application further includes:

configuring, by the base station, the size of a configuration codebook being configured currently according to a third preset condition;

wherein, the third preset condition at least includes one of the followings: the feedback mode configuration using the codebook, the value of the layer number r, the CSI Report Type configuration using the codebook, and the codeword generation model, wherein the feedback mode includes: a PUCCH feedback mode/a PUSCH feedback mode.

Optionally, the step S104 of determining, by the base station, the signaling indication method for selecting the codebook subset of the codebook according to the second preset condition further includes:

notifying a signaling indication selected by the codebook subset through high-layer signaling.

Second Embodiment

Figure 2:
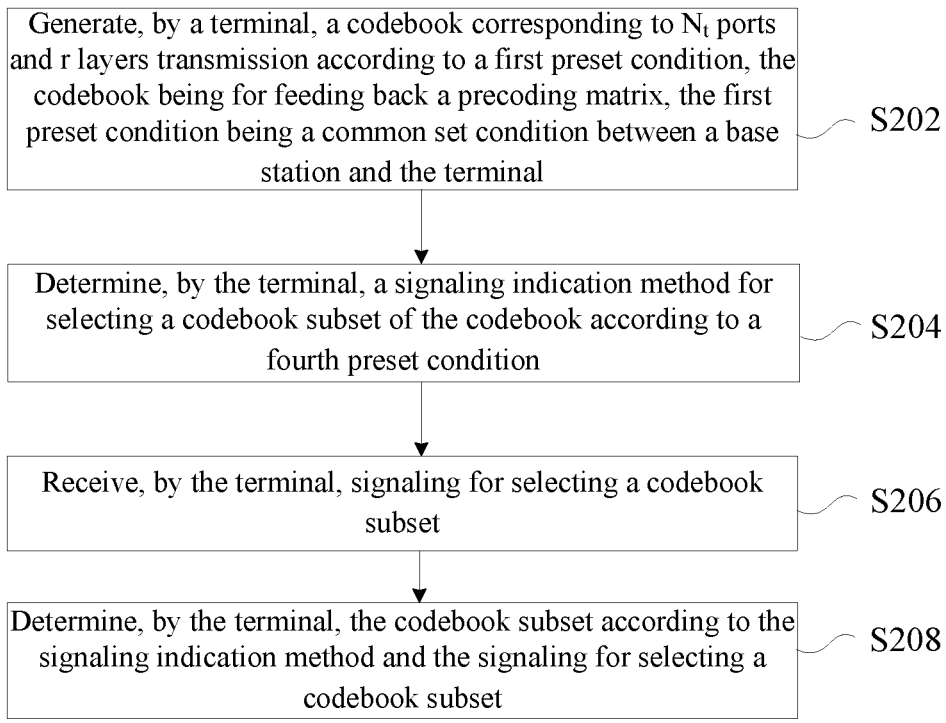
FIG. 2 is a flow chart of a method for acquiring a codebook according to an embodiment of the present disclosure.

In this embodiment, another method for acquiring a codebook is provided. FIG. 2 is a flow chart of a method for acquiring a codebook according to the embodiment of the present disclosure. As shown in FIG. 2, at a terminal side, the flow chart includes the following steps.

In step S202, a terminal generates a codebook corresponding to $N_t$ ports and r layers transmission according to a first preset condition, the codebook being for feeding back a precoding matrix, the first preset condition being a common set condition between a base station and the terminal.

In step S204, the terminal determines a signaling indication method for selecting a codebook subset of the codebook according to a fourth preset condition;

In step S206, the terminal receives signaling for selecting a codebook subset.

In step S208, the terminal determines the codebook subset according to the signaling indication method and the signaling for selecting a codebook subset.

To be specific, with reference to step S202 to step S208, at the terminal side, the terminal generates the codebook corresponding to the Nt ports and r layers transmission at the terminal side firstly, the codebook being for feeding back the precoding matrix; secondly, the terminal determines the signaling indication method for selecting a codebook subset of the codebook according to the fourth preset condition; thirdly, the terminal receives the signaling for selecting a codebook subset; and fourthly, the terminal determines the codebook subset according to the signaling indication method and the signaling for selecting a codebook subset. The codebook generation manner of the terminal is the same as the codebook generation manner of the base station.

Corresponding to the embodiment of the method for acquiring a codebook at the base station side shown in FIG. 1, the embodiment of the present application is described at the terminal side, and is corresponding to the base station side shown in FIG. 1 during the specific process of acquiring the codebook.

Through the above steps, the terminal is adapted to generate the codebook corresponding to the Nt ports and r layers transmission, the codebook being for feeding back the precoding matrix according to the first preset condition, the first preset condition being the common set condition between the base station and the terminal; the terminal determines the signaling indication method for selecting a codebook subset of the codebook according to the fourth preset condition; the terminal receives the signaling for selecting a codebook subset; and the terminal determines the codebook subset according to the signaling indication method and the signaling for selecting a codebook subset, thus solving the problem that the signaling overhead will be increased if the codebook is large because each codeword corresponds to one bit, so as to achieve the effect of decreasing the signaling overhead.

Optionally, the first preset condition at least includes one of the followings: agreeing with the base station to save the same codebook or generating the same codebook according to the same manner.

Optionally, the codebook includes at least one of the followings: $C_b(r)$ containing $M_r$ precoding codewords, wherein r is an integer greater than or equal to 1; a first main codebook $C_{b1}(r)$ containing $M_{r1}$ precoding codewords, and a second main codebook $C_{b2}(r)$ containing $M_{r2}$ precoding codewords.

Optionally, in the case that the codebook is the $C_b(r)$ containing $M_r$ precoding codewords, the step 204 of determining, by the terminal, the signaling indication method for selecting the codebook subset of the codebook according to the fourth preset condition includes the following manners:

first manner: determining a relationship between CSS signaling bits and $C_b(r)$ codewords, or, determining a relationship between the CSS signaling bits and at least one index of the $C_b(r)$ codebook; wherein, the $C_b(r)$ codebook has at least one codeword index; and/or, second manner: determining the length of the CSS signaling bit; and/or, third manner: determining the total codeword number indicated by the CSS signaling.

Referring to the determination of the signaling indication method for selecting the codebook subset of the codebook in the first embodiment, at the terminal side, when the main codebook is the $C_b(r)$, the determination methods are the same.

Optionally, in the case that the codebook is the first main codebook $C_{b1}(r)$ and the second main codebook $C_{b2}(r)$, the determining, by the terminal, the signaling indication method for selecting the codebook subset of the codebook according to the fourth preset condition includes the following manners:

first manner: determining a relationship between the CSS signaling bit and the $C_{b1}(r)$ and/or $C_{b2}(r)$ codeword; or, determining a relationship between the CSS signaling bit and the codeword index of the $C_{b1}(r)$ and/or $C_{b2}(r)$ codebook; wherein, the $C_{b1}(r)$ codebook has at least one codeword index, and the $C_{b2}(r)$ codebook has at least one codeword index; and/or, second manner: determining the length of the CSS signaling bit; and/or, third manner: determining the total codeword number indicated by the CSS signaling; and/or, a four manner of determining that the codebook corresponding to an indication for selecting the codebook subset is the $C_{b1}(r)$ and/or the $C_{b2}(r)$ Referring to the determination of the signaling indication method for selecting the codebook subset of the codebook in the first embodiment, at the terminal side, in the case that the main codebook is the first main codebook $C_{b1}(r)$ and the second main codebook $C_{b2}(r)$, the determination methods are the same.

Optionally, the fourth preset condition includes at least one of the followings: configuration signaling of the signaling indication method for selecting a codebook subset, the codeword number contained in the $C_b(r)$, a functional relationship parameter between the codeword and PMI(s), a codebook generation parameter, a feedback mode configuration using the codebook, a port number $N_t$, a layer number r, the size of a configuration codebook to be configured currently, a channel state information report type (CSI Report Type) configuration using the codebook, a feedback class (Class) A or B, and a codeword generation model, wherein the feedback mode includes: a PUCCH feedback mode/PUSCH feedback mode.

Optionally, the method for acquiring a codebook provided by the embodiment of the present application further includes:

determining, by the terminal, a size of a configuration codebook to be configured currently according to a fifth preset condition; wherein, the fifth preset condition includes at least one of the followings: the feedback mode configuration using the codebook, a value of the layer number r, and the CSI Report Type configuration using the codebook.

Optionally, after the terminal determines the codebook subset according to the signaling indication method and the signaling for selecting a codebook subset in step S210, the method for acquiring a codebook provided by the embodiment of the present application further includes:

step S211: quantizing feedback channel information according to the codebook subset.

Third Embodiment

Figure 3:
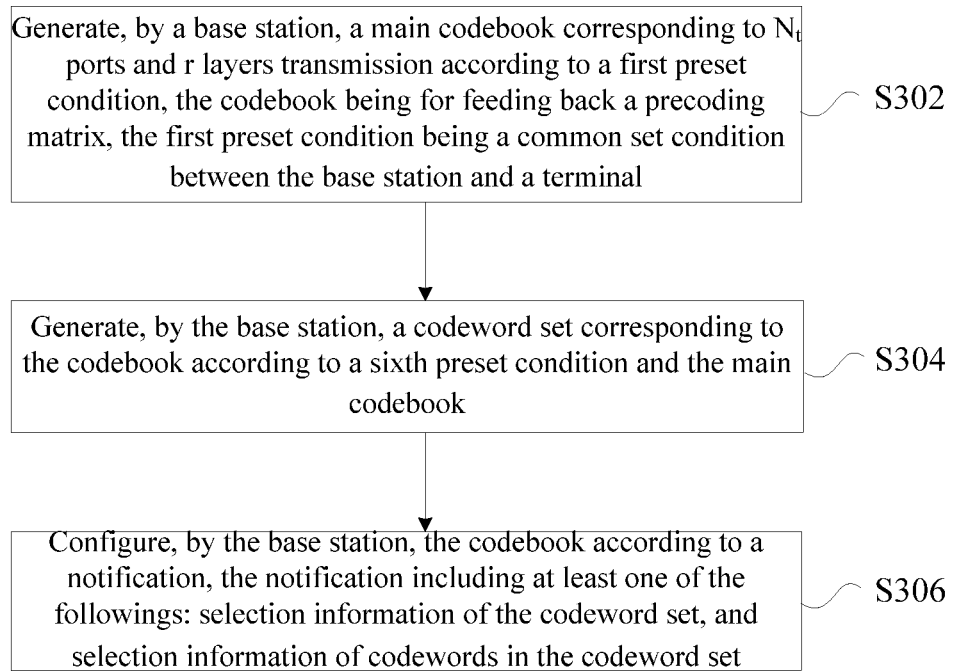
FIG. 3 is a flow chart of a method for acquiring a codebook according to another embodiment of the present disclosure.

In this embodiment, another method for acquiring a codebook is provided. FIG. 3 is a flow chart of a method for acquiring a codebook according to another embodiment of the present disclosure. As shown in FIG. 3, at a base station side, the flow chart includes following steps.

In step S302, a base station generates a main codebook corresponding to $N_t$ ports and r layers transmission according to a first preset condition, the codebook being for feeding back a precoding matrix, the first preset condition being a common set condition between the base station and a terminal.

In step S304, the base station generates a codeword set corresponding to the codebook according to a sixth preset condition and the main codebook.

In step S306, the base station configures the codebook according to a notification, the notification including at least one of the followings: selection information of the codeword set, and/or, selection information of codewords in the codeword set.

With reference to step S302 to step S306, at the base station side, the base station generates the main codebook corresponding to the Nt ports and r layer transmission in the at the base station side firstly, the main codebook being for feeding back the precoding matrix; secondly, the base station generates the codeword set corresponding to the codebook according to the sixth preset condition and the main codebook; and finally, the base station configures the codebook according to the notification.

To be specific, the base station and the terminal together save or generate the main codebook Cb(r) corresponding to the Nt ports and r layer transmission by the same manner, the main codebook Cb(r) being for feeding back the precoding matrix; the main codebook C(r) includes Mr precoding codewords; K kinds of methods are determined to select the codewords in the main codebook $C_b(r)$ to acquire K codeword sets $C_b(r,1)$, $C_b(r,2)$, ..., $C_b(r,K)$, wherein K>=1; for k=1, 2, ..., K, the codewords contained in the $C_b(r,K)$ are all or part of the codewords in the Cb(r), and the corresponding codeword number is $N_k$; when K>1, it is possible to define that the codewords in the Cb(r,k) are different when k takes different values; moreover, it is possible to define that a union of the $C_b(r,1)$, $C_b(r,2)$, ..., $C_b(r,K)$ is Cb(r). In addition, the codewords in the $C_b$ (r,K) are generated by different codeword models; for k=1, 2, ..., K, (a) $N_k$ codewords in the $C_b(r,k)$ are divided into Gk sets of codewords according to a $k^{th}$ class rule, which are respectively $C_b(r,k,1)$, ..., $C_b(r,k,G_k)$; (b) or, the Nk codewords in the Cb(r,k) are divided into $G_k$ sets of codewords according to the $k^{th}$ class rule, which are respectively $C_b(r,k,1)$, ..., $C_b(r,k,G_k)$; the codebook is constructed by the base station through notifying the selection information of the codeword sets, and/or, selection information of codewords in the codeword sets; wherein, the selection information of the codeword sets is notified, the selection information of codewords in the codeword sets is notified, or, when K>1, notifications are respectively made for different values of k.

[The value of K], [the value of $N_k$, a method for selecting $N_k$ codewords from $M_k$ to construct $C_b(r,k)$], and [a rule of dividing $N_k$ codewords into $G_k$ sets, the codeword number of the $G_k$ set] are determined according to at least one of the following parameters: a functional relationship parameter between the codeword and PMI(s), the size of a configuration codebook allowed currently, a current feedback mode (PUCCH/PUCCH Mode x-y), a port number $N_t$, and a layer number r.

Through the above steps, the base station is adopted to generate the main codebook corresponding to the Nt ports and r layer transmission according to the first preset condition, the codebook being for feeding back the precoding matrix; the base station generates the codeword set corresponding to the codebook according to the sixth preset condition and the main codebook; and the base station configures the codebook according to the notification, the notification including at least one of the followings: the selection information of the codeword set, and/or, the selection information of the codewords in the codeword set, thus solving the problem that the signaling overhead will be increased if the codebook is large because each codeword corresponds to one bit, so as to achieve the effect of decreasing the signaling overhead.

Optionally, the first preset condition at least includes one of the followings: agreeing with the terminal to save the same codebook or generating the same codebook according to the same manner.

Optionally, the main codebook is the $C_b(r)$ containing Mr precoding codewords.

Optionally, in the case that the sixth preset condition is: when K is greater than 1, determining the codeword in the codeword set according to a value of k, the step of the generating, by the base station, the codeword set corresponding to the codebook according to the sixth preset condition and the main codebook includes:

selecting the codewords in the main codebook $C_b(r)$ according to the sixth preset condition to acquire K codeword sets $C_b(r,1)$, $C_b(r,2)$, ..., $C_b(r,K)$, wherein K>=1;

wherein, when k=1, 2, ..., K, the codewords contained in the $C_b(r,k)$ are all or part of the codewords in the $C_b(r)$, and the corresponding codeword number is $N_k$.

Optionally, a union of the codeword sets $C_b(r,1)$, $C_b(r,2)$, ..., $C_b(r,K)$ is $C_b(r)$.

Optionally, the codewords in the $C_b(r,k)$ are generated by different codeword models.

Optionally, before configuring the codebook according to the notification in step S306, the method for acquiring a codebook provided by the embodiment of the present application further includes:

step S305: determining, by the base station, the notification through a seventh preset condition; wherein, the seventh preset condition includes at least one of the followings: a report type (Report Type), a feedback class (Class) A/B, a port number Nt, and a transmission layer number r.

Moreover, in the method for acquiring a codebook provided by the embodiment of the present application, the maximum codeword number of the configured codebook is determined by at least one of the followings: a feedback manner, a feedback mode, a Report Type, Class A/B, a port number Nt, and a transmission layer number r.

Optionally, the base station adopts N configuration signaling to configure codebook selection information for M feedback Types, wherein N<=M;

the base station respectively configures codebook selection information for two feedback manners PUCCH and PUSCH;

the base station respectively configures codebook selection information for two feedback Classes; and the base station respectively configures codebook selection information for multiple codeword models.

Through the description of the above embodiments, those skilled in the art can clearly understand that the method according to the above embodiments can be implemented by means of software plus a necessary general hardware platform, and, the method can be implemented by means of hardware, but in many cases, the former is a better implementation manner. Based on such understanding, the essence of the technical solutions of the embodiments of the present disclosure, or the part contributing to the prior art, may be embodied in the form of a software product which is stored in a storage medium (such as a ROM/RAM, a magnetic disk and an optical disk) including a number of instructions such that a terminal device (which may be a mobile phone, a computer, a server, or a network device, etc.) performs all or part of the method described in each of the embodiments of the present disclosure.

In this embodiment, an apparatus for acquiring a codebook is also provided. The apparatus is adapted to implement the foregoing embodiments and implementation manners, but those which have been described will not be described repeatedly. As used below, the term "module" can implement a combination of software and/or hardware with a predetermined function. Although the apparatus described in the following embodiments is implemented by means of software, the implementation of hardware or a combination of software and hardware is also possible and conceived.

Fourth Embodiment

Figure 4:
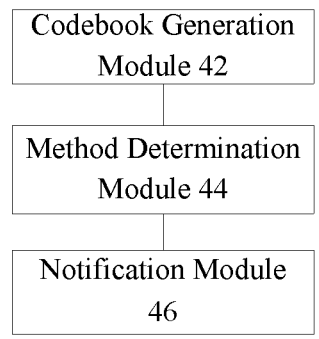
FIG. 4 is a structural diagram of an apparatus for acquiring a codebook according to an embodiment of the present disclosure.

In this embodiment, an apparatus for acquiring a codebook is provided. FIG. 4 is a structural diagram of an apparatus for acquiring a codebook according to an embodiment of the present disclosure. As shown in FIG. 4, the apparatus includes: a codebook generation module 42, a method determination module 44 and a notification module 46.

The codebook generation module 42 is adapted to generate a codebook corresponding to $N_t$ ports and r layers transmission according to a first preset condition, the codebook being for feeding back a precoding matrix, the first preset condition being a common set condition between a base station and a terminal.

The method determination module 44 is adapted to determine a signaling indication method for selecting a codebook subset of the codebook according to a second preset condition.

The notification module 46 is adapted to acquire CSS signaling for selecting a codebook subset correspondingly according to the signaling indication method, and notify the selected codebook subset to the terminal through the CSS signaling.

According to the apparatus for acquiring a codebook provided by the embodiment of the present application, the base station is adopted to generate the codebook corresponding to the Nt ports and r layers transmission, the codebook being for feeding back the precoding matrix according to the first preset condition, the first preset condition being the common set condition between the base station and the terminal; the base station determines the signaling indication method for selecting a codebook subset of the codebook according to the second preset condition; and the base station obtains the CSS signaling for selecting a codebook subset correspondingly according to the signaling indication method, and notifies the selected codebook subset to the terminal through the CSS signaling, thus solving the problem that the signaling overhead will be increased if the codebook is large because each codeword corresponds to one bit, so as to achieve the effect of decreasing the signaling overhead.

Figure 5:
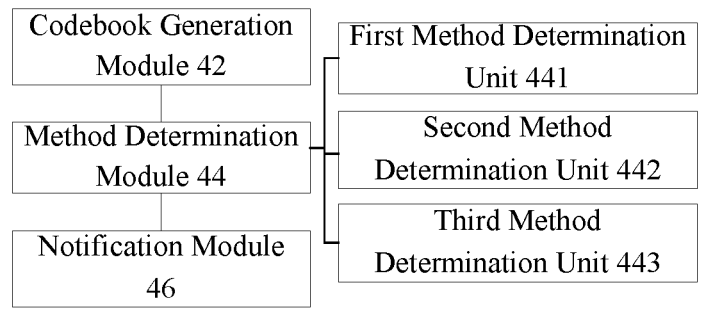
FIG. 5 is a structural diagram of another apparatus for acquiring a codebook according to an embodiment of the present disclosure.

Optionally, FIG. 5 is a structural diagram of another apparatus for acquiring a codebook according to the embodiment of the present disclosure. As shown in FIG. 5, in the case that the codebook is a Cb(r) containing Mr precoding codewords, the method determination module 44 includes: a first method determination unit 441, a second method determination unit 442 and a third method determination unit 443, wherein:

the first method determination unit 441 is adapted to determine a relationship between CSS signaling bits and $C_b(r)$ codewords, or, determine a relationship between the CSS signaling bits and at least one index of the Cb(r) codebook; wherein, the $C_b(r)$ codebook has at least one codeword index;

the second method determination unit 442 is adapted to determine the length of the CSS signaling bit; and/or, the third method determination unit 443 is adapted to determine the total codeword number indicated by the CSS signaling.

Figure 6:
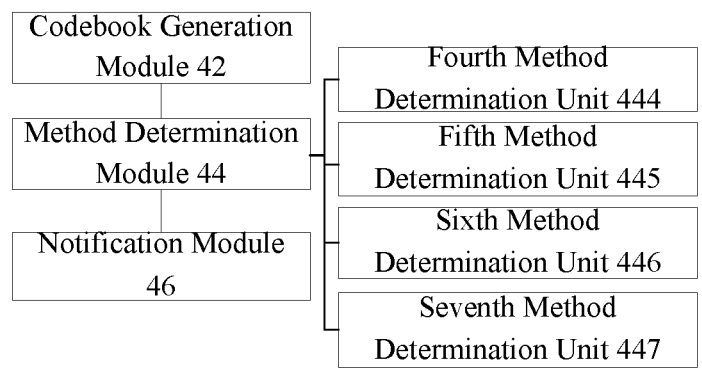
FIG. 6 is a structural diagram of another apparatus for acquiring a codebook according to an embodiment of the present disclosure.

Optionally, FIG. 6 is a structural diagram of another apparatus for acquiring a codebook according to an embodiment of the present disclosure. As shown in shown in FIG. 6, in the case that the codebook is a first main codebook $C_{b1}(r)$ and a second main codebook $C_{b2}(r)$, the determination module 44 includes: a fourth method determination unit 444, a fifth method determination unit 445, a sixth method determination unit 446 and a seventh method determination unit 447, wherein:

the first method determination unit 444 is adapted to determine a relationship between CSS signaling bits and the $C_{b1}(r)$ and/or $C_{b2}(r)$ codewords; or, determine a relationship between the CSS signaling bit and the codeword index of the $C_{b1}(r)$ and/or $C_{b2}(r)$ codebook; wherein, the $C_{b1}(r)$ codebook has at least one codeword index, and the $C_{b2}(r)$ codebook has at least one codeword index; and/or, the fifth method determination unit 445 is adapted to determine the length of the CSS signaling bit; and/or, the sixth method determination unit 446 is adapted to determine the total codeword number indicated by the CSS signaling; and/or, the seventh method determination unit 447 is adapted to determine that the codebook corresponding to an indication for selecting the codebook subset is the $C_{b1}(r)$ and/or the $C_{b2}(r)$.

Fifth Embodiment

Figure 7:
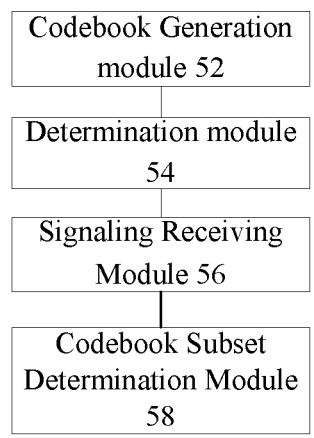
FIG. 7 is a structural diagram of an apparatus for acquiring a codebook according to another embodiment of the present disclosure.

In this embodiment, an apparatus for acquiring a codebook is provided. FIG. 7 is a structural diagram of an apparatus for acquiring a codebook according to another embodiment of the present disclosure. As shown in FIG. 7, at a terminal side, the apparatus includes: a codebook generation module 52, a determination module 54, a signaling receiving module 56 and a codebook subset determination module 58, wherein:

the codebook generation module 52 is adapted to generate a codebook corresponding to $N_t$ ports and r layers transmission according to a first preset condition, the codebook being for feeding back a precoding matrix, the first preset condition being a common set condition between a base station and a terminal;

the determination module 54 is adapted to determine a signaling indication method for selecting a codebook subset of the codebook according to a fourth preset condition;

the signaling receiving module 56 is adapted to receive signaling for selecting a codebook subset; and the codebook subset determination module 58 is adapted to determine the codebook subset according to the signaling indication method and the signaling for selecting a codebook subset.

According to the apparatus for acquiring a codebook provided by the embodiment of the present application, the terminal is adopted to generate the codebook corresponding to the Nt ports and r layers transmission according to the first preset condition, the codebook being for feeding back the precoding matrix, the first preset condition being the common set condition between the base station and the terminal; the terminal determines the signaling indication method for selecting a codebook subset of the codebook according to the fourth preset condition; the terminal receives the signaling for selecting a codebook subset; and the terminal determines the codebook subset according to the signaling indication method and the signaling for selecting a codebook subset, thus solving the problem that the signaling overhead will be increased if the codebook is large because each codeword corresponds to one bit, so as to achieve the effect of decreasing the signaling overhead.

Figure 8:
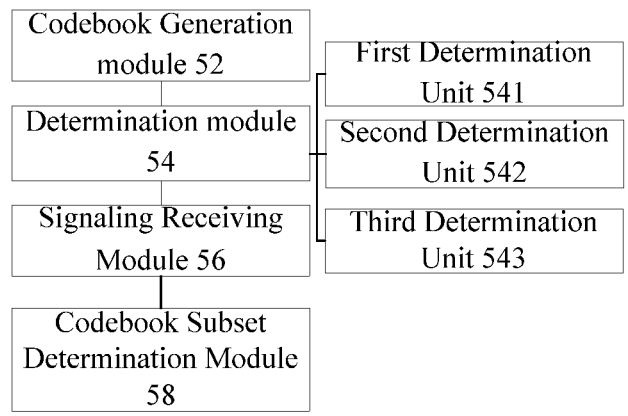
FIG. 8 is a structural diagram of another apparatus for acquiring a codebook according to another embodiment of the present disclosure.

Optionally, FIG. 8 is a structural diagram of another apparatus for acquiring a codebook according to another embodiment of the present disclosure. As shown in FIG. 8, in the case that the codebook is a Cb(r) containing Mr precoding codewords, the determination module 54 includes: a first determination unit 541, a second determination unit 542 and a third determination unit 543, wherein:

the first determination unit 541 is adapted to determine a relationship between CSS signaling bits and $C_b(r)$ codewords, or, determine a relationship between the CSS signaling bits and at least one index of the $C_b(r)$ codebook; wherein, the $C_b(r)$ codebook has at least one the codeword index; and/or, the second determination unit 542 is adapted to determine the length of the CSS signaling bit; and/or, the third determination unit 543 is adapted to determine the total codeword number indicated by the CSS signaling.

Figure 9:
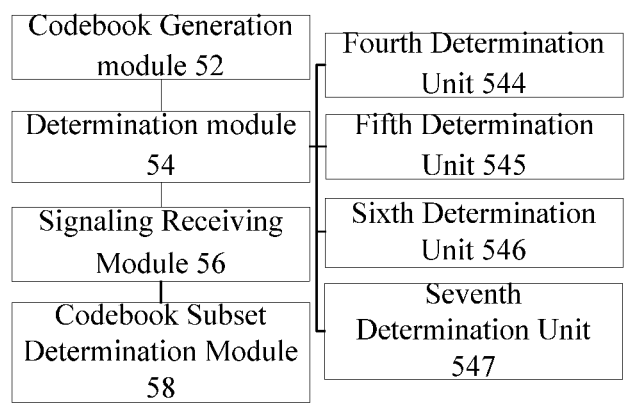
FIG. 9 is a structural diagram of another apparatus for acquiring a codebook according to another embodiment of the present disclosure.

Optionally, FIG. 9 is a structural diagram of another apparatus for acquiring a codebook according to another embodiment of the present disclosure. As shown in FIG. 9, in the case that the codebook is a first main codebook Cb1(r) and a second main codebook Cb2(r), the determination module 54 includes: a fourth determination unit 544, a fifth determination unit 545, a sixth determination unit 546 and a seventh determination unit 547, wherein:

the fourth determination unit 544 is adapted to determine a relationship between the CSS signaling bit and the $C_{b1}(r)$ and/or $C_{b2}(r)$ codeword; or, determine a relationship between the CSS signaling bit and the codeword index of the $C_{b1}(r)$ and/or $C_{b2}(r)$ codebook; wherein, the $C_{b1}(r)$ codebook has at least one codeword index, and the $C_{b2}(r)$ codebook has at least one codeword index; and/or, the fifth determination unit 545 is adapted to determine the length of the CSS signaling bit; and/or, the sixth determination unit 546 is adapted to determine the total codeword number indicated by the CSS signaling; and/or, the seventh determination unit 547 is adapted to determine that the codebook corresponding to an indication for selecting the codebook subset is the $C_{b1}(r)$ and/or the $C_{b2}(r)$.

Figure 10:
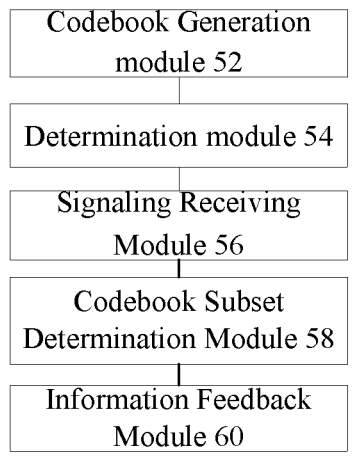
FIG. 10 is a structural diagram of another apparatus for acquiring a codebook according to another embodiment of the present disclosure.

Optionally, FIG. 10 is a structural diagram of another apparatus for acquiring a codebook according to another embodiment of the present disclosure. As shown in FIG. 10, the apparatus for acquiring a codebook provided by the embodiment of the present application further includes: an information feedback module 60, wherein:

the information feedback module 60 is adapted to, after the terminal determines the codebook subset according to the signaling indication method and the signaling for selecting a codebook subset, quantize feedback channel information according to the codebook subset.

Sixth Embodiment

Figure 11:
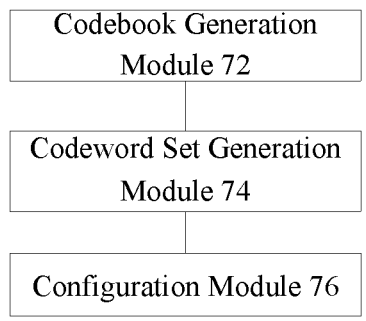
FIG. 11 is a structural diagram of an apparatus for acquiring a codebook according to still another embodiment of the present disclosure.

In this embodiment, another apparatus for acquiring a codebook is provided. FIG. 11 is a structural diagram of an apparatus for acquiring a codebook according to another embodiment of the present disclosure. As shown in FIG. 11, at a base station side, the apparatus includes: a codebook generation module 72, a codeword set generation module 74 and a configuration module 76, wherein:

the codebook generation module 72 is adapted to generate a main codebook corresponding to $N_t$ ports and r layers transmission according to a first preset condition, the codebook being for feeding back a precoding matrix, the first preset condition being a common set condition between a base station and a terminal;

the codeword set generation module 74 is adapted to generate a codeword set corresponding to the codebook according to a sixth preset condition and the main codebook; and the configuration module 76 is adapted to configure the codebook according to a notification, the notification including at least one of the followings: selection information of the codeword set, and/or, selection information of codewords in the codeword set.

According to the apparatus for acquiring a codebook provided by the embodiment of the present application, at the base station side, the base station is adopted to generate the main codebook corresponding to Nt ports and r layer transmission according to the first preset condition, the main codebook being for feeding back the precoding matrix; the base station generates the codeword set corresponding to the codebook according to the sixth preset condition and the main codebook; and the base station configures the codebook according to the notification, the notification including at least one of the followings: the selection information of the codeword set, and/or, the selection information of the codewords in the codeword set, thus solving the problem that the signaling overhead will be increased if the codebook is large because each codeword corresponds to one bit, so as to achieve the effect of decreasing the signaling overhead.

Figure 12:
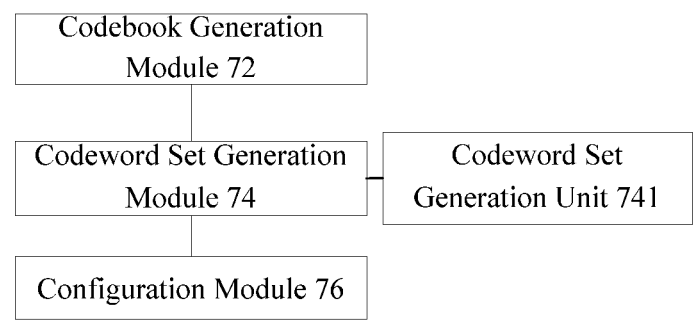
FIG. 12 is a structural diagram of another apparatus for acquiring a codebook according to still another embodiment of the present disclosure.

Optionally, FIG. 12 is a structural diagram of another apparatus for acquiring a codebook according to still another embodiment of the present disclosure. As shown in FIG. 12, in the case that the sixth preset condition is: when K is greater than 1, determining the codeword in the codeword set according to a value of k, the codeword set generation module 74 includes: a codeword set generation unit 741, wherein:

the codeword set generation unit 741 is adapted to select the codewords in the main codebook $C_b(r)$ according to the sixth preset condition to acquire K codeword sets $C_b(r,1)$, $C_b(r,2)$, . . . , $C_b(r,K)$, wherein K>=1;

wherein, when k=1, 2, . . . , K, the codewords contained in the $C_b(r,k)$ are all or part of the codewords in the $C_b(r)$, and the corresponding codeword number is Nk.

Figure 13:
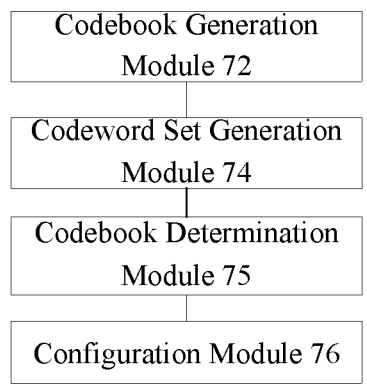
FIG. 13 is a structural diagram of another apparatus for acquiring a codebook according to still another embodiment of the present disclosure; and, FIG. 14 is a structural diagram of a system for acquiring a codebook according to still another embodiment of the present disclosure.

Optionally, FIG. 13 is a structural diagram of another apparatus for acquiring a codebook according to still another embodiment of the present disclosure. As shown in FIG. 13, the apparatus for acquiring a codebook provided by the embodiment of the present application further includes: a codebook determination module 75, wherein:

the codebook determination module 75 is adapted to, before configuring the codebook according to the notification, determine the notification through a seventh preset condition; wherein, the seventh preset condition includes at least one of the followings: a report type (Report Type), a feedback class (Class) A/B, a port number Nt, and a transmission layer number r.

Seventh Embodiment

Figure 14:
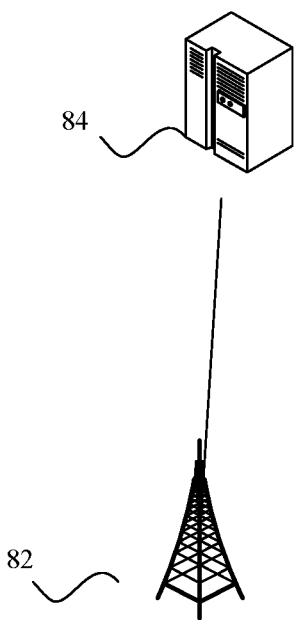

In this embodiment, a system for acquiring a codebook is provided. FIG. 14 is a structural diagram of a system for acquiring a codebook according to still another embodiment of the present disclosure. As shown in FIG. 14, the system includes: a base station 82 and a terminal 84, the base station 82 and the terminal 84 are in communication connection.

The base station 82 is any one of the apparatus for acquiring a codebook shown in FIG. 4 to FIG. 6, or, FIG. 11 to FIG. 13.

The terminal 84 is any one of the apparatus for acquiring a codebook shown in FIG. 7 to FIG. 10.

It should be noted that the above modules can be implemented by software or hardware. For the latter, it may be implemented by the following manners, but is not limited to this: the above modules are all disposed in the same processor; or, the above modules are respectively disposed in multiple processors.

The embodiment of the present disclosure also provides a storage medium. Optionally, the above storage medium in the embodiment may be adapted to store program codes for executing the following steps:

S1: generating, by a base station, a codebook corresponding to $N_t$ ports and r layers transmission according to a first preset condition, the codebook being for feeding back a precoding matrix, the first preset condition being a common set condition between the base station and a terminal;

S2: determining, by the base station, a signaling indication method for selecting a codebook subset of the codebook according to a second preset condition; and S3: acquiring, by the base station, CSS signaling for selecting a codebook subset correspondingly according to the signaling indication method, and notifying the selected codebook subset to the terminal through the CSS signaling.

Optionally, the above storage medium in the embodiment may include, but is not limited to any medium that is capable of storing program codes like a USB disk, a read-only memory (ROM, Read-Only Memory), a random access memory (RAM, Random Access Memory), a mobile hard disk, a magnetic disk or an optical disk.

Optionally, in the embodiment, in the case that the processor executes the program codes stored in the storage medium when the codebook is the Cb(r) containing Mr precoding codewords, the determining, by the base station, the signaling indication method for selecting a codebook subset corresponding to the codebook according to the second preset condition includes the following manners: a first manner of determining a relationship between CSS signaling bits and $C_b(r)$ codewords, or, determining a relationship between the CSS signaling bits and at least one index of the $C_b(r)$ codebook; wherein, the $C_b(r)$ codebook has at least one codeword index; and/or, a second manner of determining the length of the CSS signaling bit; and/or, a third manner of determining the total codeword number indicated by the CSS signaling.

Optionally, in the embodiment, in the case that the processor executes the program codes stored in the storage medium when the codebook is a first main codebook $C_{b1}(r)$ and a second main codebook $C_{b2}(r)$, the base station determines the signaling indication method for selecting a codebook subset corresponding to the codebook according to the second preset condition, including the following manners: a first manner of determining a relationship between the CSS signaling bit and the $C_{b1}(r)$ and/or $C_{b2}(r)$ codeword; or, determining a relationship between the CSS signaling bit and the codeword index of the Cb1($r$) and/or Cb2($r$) codebook; wherein, the $C_{b1}(r)$ codebook has at least one codeword index, and the $C_{b2}(r)$ codebook has at least one codeword index; and/or, a second manner of determining the length of the CSS signaling bit; and/or, a third manner of determining the total codeword number indicated by the CSS signaling; and/or a fourth manner of determining that the codebook corresponding to an indication for selecting the codebook subset is the $C_{b1}(r)$ and/or the $C_{b2}(r)$.

Optionally, in the embodiment, the processor executes the following step according to the program codes stored in the storage medium: the base station configures the size of a configuration codebook to be configured currently according to a third preset condition; wherein, the third preset condition at least includes one of the followings: the feedback mode configuration using the codebook, a value of the layer number r, the CSI Report Type configuration using the codebook, and the codeword generation model, wherein the feedback mode includes: PUCCH/PUCCH and/or Mode x-y.

Optionally, in the embodiment, the step that the processor, according to the program codes stored in the storage medium, executes to determine the signaling indication method for selecting a codebook subset corresponding to the codebook by the base station according to the second preset condition, further including: notifying a signaling indication for selecting a codebook subset through high-layer signaling.

Optionally, the specific examples in this embodiment may be referred to the examples described in the foregoing embodiments and optional embodiments, which will not be elaborated in the embodiment.

It will be apparent to those skilled in the art that the above-described modules or steps of the present disclosure may be implemented by a general purpose computing device which may be focused on a single computing device or distributed over a plurality of computing devices, which may optionally be implemented by a program code executable by the computing device, so that they may be stored in a storage device by the computing device and, in some cases, the steps shown or described may be performed in sequence different from here; or they are separately made into each integrated circuit module, or multiple modules or steps in them are made into a single integrated circuit module. Thus, the invention is not limited to any particular combination of hardware and software.

Those described above are merely preferred embodiments of the invention, but are not intended to limit the present disclosure. Any modification, equivalent replacement, and improvement made within the spirit and principle of the present disclosure shall all fall within the protection scope of the present disclosure.

INDUSTRIAL APPLICABILITY

The embodiments of the prevent disclosure provide the method, apparatus and system for acquiring a codebook. In one or more examples: the base station generates the codebook corresponding to $N_t$ ports and r layer transmission according to the first preset condition, the codebook being used for feeding back a precoding matrix, the first preset condition being a common set condition between the base station and the terminal; and the base station obtains the CSS signaling for selecting a codebook subset correspondingly according to the signaling indication method, and notifies the selected codebook subset to the terminal through the CSS signaling, thus solving the problem that the signaling overhead will be increased if the codebook is large because each codeword corresponds to one bit, so as to achieve the effect of decreasing the signaling overhead.

What is claimed is:

1. A method for acquiring a codebook, comprising:
generating, by a base station, a main codebook corresponding to $N_t$ ports and r layers transmission according to a first preset condition; wherein $N_t$ is a number of ports and r is a number of transmission layers, and the first preset condition is a common set condition between the base station and a terminal and at least comprises the terminal saving the same main codebook;
generating, by the base station, one or more codeword sets corresponding to the main codebook according to a sixth preset condition and the main codebook; and
configuring, by the base station, the codebook according to a notification; wherein the terminal is configured to select a precoding matrix from the codebook and feedback precoding matrix indicators corresponding to the precoding matrix, and the notification comprises at least one of: information of selecting a codeword set from the one or more codeword sets, or information of selecting a codeword from one of the one or more codeword sets.

2. The method according to claim 1, wherein the first preset condition comprises at least one of:
agreeing with the terminal to save the same main codebook or generating the same main codebook according to a same manner.

3. The method according to claim 1, wherein the main codebook is $C_b(r)$ containing Mr precoding codewords; wherein b is an integer and Mr is a number of the precoding codewords.

4. The method according to claim 3, wherein in case that the sixth preset condition is: when K is greater than 1, determining codewords in the one or more codeword sets according to a value of k, the step of the generating, by the base station, the one or more codeword sets corresponding to the main codebook according to the sixth preset condition and the main codebook comprises:
selecting the codewords from the main codebook $C_b(r)$ according to the sixth preset condition to acquire K codeword sets $C_b(r,1)$, $C_b(r,2)$, ..., $C_b(r, K)$, wherein K>=1;
wherein when k=1, 2, ..., K, codewords contained in the $C_b(r,k)$ are all or part of codewords in the $C_b(r)$, and a corresponding codeword number is Nk.

5. The method according to claim 4, wherein a union of the one or more codeword sets $C_b(r,1)$, $C_b(r,2)$, ..., $C_b(r,K)$ is the $C_b(r)$.

6. The method according to claim 4, wherein the codewords in the $C_b(r,k)$ are generated from different codeword models.

7. The method according to claim 1, before configuring the codebook according to the notification, further comprising:
determining, by the base station, the notification through a seventh preset condition; wherein, the seventh preset condition comprises at least one of: a report type (Report Type), a feedback class (Class) A/B, the number of ports $N_t$, or the number of transmission layers r.

8. An apparatus for acquiring a codebook, comprising:
a processor; and
a memory for storing instructions executable by the processor;
wherein the processor is configured to:
generate a main codebook corresponding to $N_t$ ports and r layers transmission according to a first preset condition; wherein $N_t$ is a number of ports and r is a number of transmission layers, and the first preset condition is a common set condition between a base station and a terminal and at least comprises the terminal saving the same main codebook;
generate one or more codeword sets corresponding to the main codebook according to a sixth preset condition and the main codebook; and
configure the codebook according to a notification; wherein the terminal is configured to select a precoding matrix from the codebook and feedback precoding matrix indicators corresponding to the precoding matrix, and the notification comprises at least one of: information of selecting a codeword set from the one or more codeword sets, or information of selecting a codeword from one of the one or more codeword sets.

9. The apparatus according to claim 8, wherein in case that the sixth preset condition is: when K is greater than 1, determining codewords in the one or more codeword sets according to a value of k, the processor is further configured to:
select the codewords from the main codebook $C_b(r)$ according to the sixth preset condition to acquire K codeword sets $C_b(r,1)$, $C_b(r,2)$, ..., $C_b(r,K)$, wherein K>=1;
wherein when k=1, 2, ..., K, codewords contained in the $C_b(r,k)$ are all or part of codewords in the $C_b(r)$, and a corresponding codeword number is Nk.

10. The apparatus according to claim 8, wherein the processor is further configured to:
before configuring the codebook according to the notification, determine the notification through a seventh preset condition; wherein the seventh preset condition comprises at least one of: a report type (Report Type), a feedback class (Class) A/B, the number of ports $N_t$, or the number of transmission layers r.

11. The apparatus according to claim 8, wherein the first preset condition comprises at least one of:
agreeing with the terminal to save the same main codebook or generating the same main codebook according to a same manner.

12. The apparatus according to claim 9, wherein the main codebook $C_b(r)$ contains Mr precoding codewords; wherein b is an integer and Mr is a number of the precoding codewords.

13. The apparatus according to claim 9, wherein a union of the one or more codeword sets $C_b(r,1)$, $C_b(r,2)$, ..., $C_b(r,K)$ is the $C_b(r)$.

14. The apparatus according to claim 9, wherein the codewords in the $C_b(r,k)$ are generated from different codeword models.

15. A system for acquiring a codebook, comprising a base station and a terminal, wherein the base station and the terminal is communicatively connected; wherein
the base station is configured to: generate a main codebook corresponding to $N_t$ ports and r layers transmission according to a first preset condition; wherein $N_t$ is a number of ports, and r is a number of transmission layers, and the first preset condition is a common set condition between the base station and the terminal and at least comprises the terminal saving the same main codebook; generate one or more codeword sets corresponding to the main codebook according to a sixth preset condition and the main codebook; configure the codebook according to a notification; wherein the terminal is configured to select a precoding matrix from the codebook and feedback precoding matrix indicators corresponding to the precoding matrix, and the notification comprises at least one of: information of selecting a codeword set from the one or more codeword sets, or information of selecting a codeword from one of the one or more codeword sets; and notify the configured codebook to the terminal through CSS signaling; and the terminal is configured to: obtain the main codebook corresponding to the $N_t$ ports and the r layers transmission according to the first preset condition; receive the CSS signaling transmitted from the base station; and determine the codebook from the main codebook according to the CSS signaling.

16. The system according to claim 15, wherein the first preset condition comprises at least one of:
agreeing with the terminal to save the same main codebook or generating the same main codebook according to a same manner.

17. The system according to claim 15, wherein the main codebook is $C_b(r)$ containing Mr precoding codewords; wherein b is an integer and Mr is a number of the precoding codewords.

18. The system according to claim 17, wherein in case that the sixth preset condition is: when K is greater than 1, determining codewords in the one or more codeword sets according to a value of k, the base station is further configured to:
select the codewords from the main codebook $C_b(r)$ according to the sixth preset condition to acquire K codeword sets $C_b(r,1)$, $C_b(r,2)$, ..., $C_b(r,K)$, wherein $K>=1$;
wherein when k=1, 2, ..., K, codewords contained in the $C_b(r,k)$ are all or part of codewords in the $C_b(r)$, and a corresponding codeword number is Nk.

19. The system according to claim 18, wherein a union of the one or more codeword sets $C_b(r,1)$, $C_b(r,2)$, ..., $C_b(r,K)$ is the $C_b(r)$.

20. The system according to claim 15, wherein the base station is further configured to:
before configuring the codebook according to the notification, determine the notification through a seventh preset condition; wherein the seventh preset condition comprises at least one of: a report type (Report Type), a feedback class (Class) A/B, the number of ports $N_t$, or the number of transmission layers r.

* * * * *